United States Patent [19]

Horikawa

[11] 4,205,966
[45] Jun. 3, 1980

[54] SYSTEM FOR ULTRASONIC WAVE TYPE BUBBLE REMOVAL

[75] Inventor: Hiroshi Horikawa, Minami-ashigara, Japan

[73] Assignee: Fuji Photo Film Co., Ltd., Minami-ashigara, Japan

[21] Appl. No.: 956,941

[22] Filed: Nov. 2, 1978

[51] Int. Cl.$^2$ ............................................. B01D 51/08
[52] U.S. Cl. .......................................... 55/15; 55/36; 55/277; 210/19
[58] Field of Search .................. 55/15, 277, 36, 38–43, 55/46, 49, 80; 210/19

[56] References Cited

U.S. PATENT DOCUMENTS

| 2,376,221 | 5/1945 | Baker | 55/15 |
| 3,904,392 | 9/1975 | VanIngen et al. | 55/15 |
| 4,127,394 | 11/1978 | Verhille | 55/15 |

FOREIGN PATENT DOCUMENTS 51-5295  2/1976  Japan ............................................. 55/15

Primary Examiner—Richard L. Chiesa
Attorney, Agent, or Firm—Sughrue, Rothwell, Mion, Zinn and Macpeak

[57] ABSTRACT

An ultrasonic wave type bubble removing system for removing bubbles from a first liquid from which bubbles should be removed, by imparting ultrasonic wave vibration to the first liquid. A part of a liquid conduit is provided in an ultrasonic wave liquid tank which has an ultrasonic wave oscillator and is filled with an ultrasonic wave propagating liquid. An absolute pressure of 1.3 Kg/cm$^2$ or higher is maintained applied inside the liquid conduit. Ultrasonic wave vibration generated by the ultrasonic wave oscillator is imparted to the first liquid which is continuously delivered without causing a vapor-liquid interface in the liquid pipe, to dissolve the bubbles in the first liquid and to prevent deposition of bubbles under the atmospheric pressure.

14 Claims, 5 Drawing Figures

SYSTEM FOR ULTRASONIC WAVE TYPE BUBBLE REMOVAL

BACKGROUND OF THE INVENTION

This invention relates to a method and apparatus for removing the bubbles contained in a liquid delivered continuously, and more particularly to a method and apparatus in which the bubbles contained in a liquid are dissolved therein to eliminate them. The deposition of bubbles is also prevented when the liquid is used.

Various methods in which the bubbles in a liquid are removed by utilizing ultrasonic waves and in which deposition of bubbles is prevented are well known in the art. For instance, U.S. Pat. No. 3,904,392 discloses a method in which a vacuum chamber and a pressure chamber are provided in a liquid delivering path, and a liquid having bubbles to be removed (hereinafter referred to as "a bubble removal liquid" when applicable) is continuously supplied into each chamber. At the same time a vapor-liquid interface for allowing bubbles to surface is maintained in each chamber, and an ultrasonic wave is applied to the bubble removal liquid to remove the bubbles therefrom.

Hence, in this conventional method, first in the vacuum chamber, relatively large bubbles contained originally in the liquid and bubbles which have been dissolved in the liquid are deposited as a result of the decrease of the solubility caused by the reduction of pressure. They are collected in the vapor-liquid interface to be eliminated by the ultrasonic wave. Then, in the pressure chamber, relatively small bubbles which could not be eliminated in the vacuum chamber are dissolved in the liquid by the interaction of the increase of solubility and the ultrasonic wave so as to eliminate the small bubbles.

This method, however, has a principle drawback in that since a vapor-liquid interface exists in each chamber, the gas on the liquid surface is additionally dissolved in the liquid during the application of pressure. As a consequence the density of air in the liquid is increased, and when the liquid is delivered to, for instance, a coating section under the atmospheric pressure, the density of air in the liquid is supersaturated when compared with the saturation solubility of air with respect to the liquid. As a result the bubbles dissolved in the liquid are again deposited. Therefore, this method is not applicable to the removal of bubbles from a bubble removal liquid such as photographic emulsion liquid. In such a system if a film formed by using the photographic emulsion liquid has a single bubble, the film is classified as a film poor in quality; that is, the film cannot be used.

In order to prevent such deposition of bubbles, a different method of suitably controlling the pressure conditions and the level of the liquid surface has been proposed. However, the control operation is rather intricate and difficult to commercialize.

Each of the above-described vacuum and pressure chambers is in the form of a tank. Therefore, the liquid flowing into the chamber is not generally allowed to directly flow out of the chamber. That is, a larger part of the liquid is retained in the chamber, which results in the non-uniform flow of the liquid. Therefore, it is not preferable to apply the conventional method to the removal of bubbles from a liquid such as a photographic emulsion liquid where the retention time greatly affects the quality of a picture. Furthermore, the conventional method suffers from the drawback that bubbles cannot be removed uniformly.

Another example of the conventional ultrasonic wave type bubble removing method is a method of removing bubbles from silver halogenide photographic emulsion liquid disclosed by Japanese Patent Publication No. 5295/1976. In this conventional system, as shown in FIG. 1, a silver halogenide photographic emulsion 2 containing bubbles is supplied, under a pressure of 1.3 Kg/cm$^2$ or higher, through a liquid conduit 7 into an ultrasonic wave liquid tank 9. The removal of bubbles is carried out by utilizing the ultrasonic wave vibration generated by an ultrasonic wave oscillator 11 on the bottom of the liquid tank.

This method is similar to the method of U.S. Pat. No. 3,904,392 described before in that the ultrasonic wave is applied directly to the bubble removal liquid and the bubbles are collected in the vapor-liquid interface in the bubble removing tank thereby to eliminate the bubbles. Therefore, in this method also, for the same reason described above, i.e. the vapor-liquid interface exists, the gas on the liquid surface is newly dissolved in the liquid. When the liquid is delivered from the bubble removing tank to, for instance, a coating section which is under the atmospheric pressure, the gas dissolved in the liquid is deposited as bubbles again.

SUMMARY OF THE INVENTION

Accordingly, an object of this invention is to provide a bubble removing system in which the bubbles in a liquid continuously delivered are removed.

It is another object of this invention to define a system wherein when the liquid is used under atmospheric pressure, as in the case of applying a photographic emulsion liquid, no bubbles are deposited.

Yet another object of the invention is to provide a bubble removing system in which the retention and condensation of a bubble removal liquid are not caused while it is being continuously delivered, whereby the removal of bubbles can be effectively achieved with the uniform flow of the liquid.

A further object of the invention is to provide a bubble removing system in which the cleaning and operation are simple, and the removal of bubbles can be achieved at relatively low cost.

The foregoing objects of this invention have been achieved by the provision of an ultrasonic wave type bubble removing system where, according to the invention, a part of a liquid conduit is provided in an ultrasonic wave liquid tank which is provided with an ultrasonic wave oscillator and is filled with an ultrasonic wave propagating liquid. An absolute pressure of 1.3 Kg/cm$^2$ or higher is maintained applied inside the liquid conduit. Ultrasonic wave vibration generated by the ultrasonic wave oscillator is imparted to a liquid from which bubbles should be removed and which is continuously delivered without causing a vapor-liquid interface in the liquid pipe, to dissolve the bubbles in the liquid and to prevent deposition of bubbles under the atmospheric pressure.

This invention will be described with reference to the drawings and the preferred embodiment that follows.

DESCRIPTION OF THE PREFERRED EMBODIMENTS

Figures 1, 2:
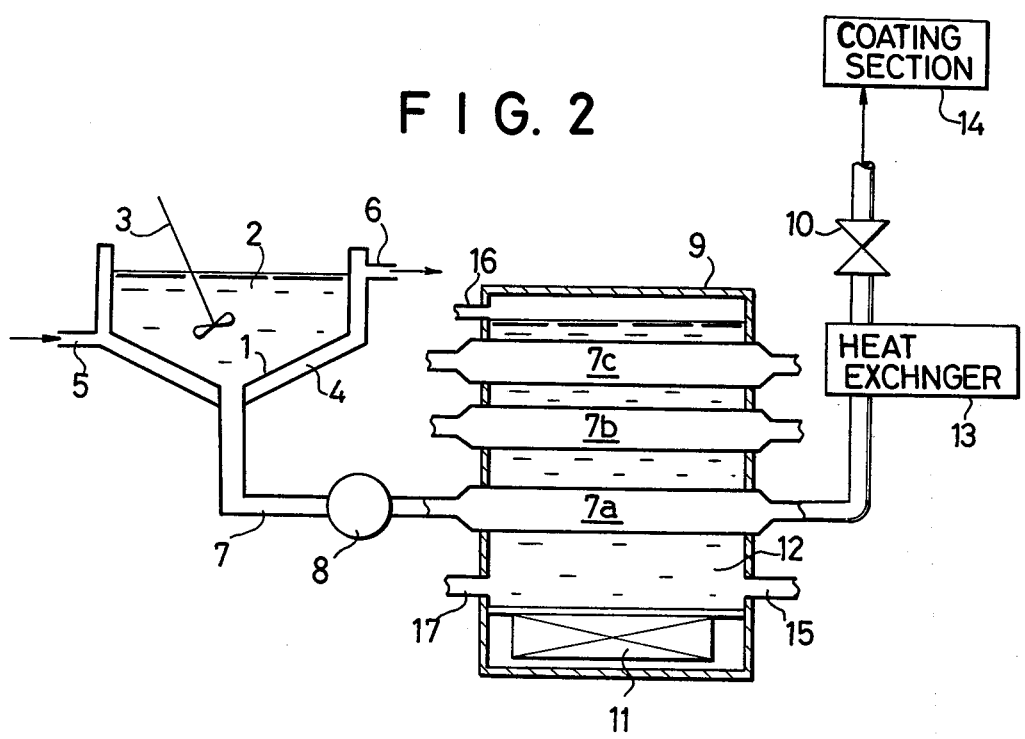
FIG. 1 is a sectional view showing a conventional bubble removing device.
FIG. 2 is a sectional view showing one example of a bubble removing device according to the invention.

This invention will now be described with reference to its preferred embodiments shown in the accompanying drawings. FIG. 2 shows the outline of a device for removing bubbles from a silver halogenide photographic emulsion liquid according to this invention.

Referring first to FIG. 2, reference numeral 1 designates a tank with an agitator 3. In the tank 1, a photographic emulsion liquid 2 containing gelatin and silver halogenide is stored while being agitated. A hot water jacket 4 is adapted to maintain the photographic emulsion liquid 2 at a temperature higher than or substantially equal to the temperature of a coating section 14 before the liquid 2 is delivered to that section. The hot water jacket 4 is provided with a hot water inlet 5 and a hot water outlet 6. A liquid delivering conduit 7 couples the bottom of the tank 1 through an ultrasonic wave liquid tank 9 to the coating section. The photographic emulsion liquid 2 is continuously supplied through the liquid conduit 7 by means of a pump 8.

A pipe line 7a extends from the liquid conduit 7, and is disposed straight and substantially horizontal (somewhat sloped) in the ultrasonic wave liquid tank 9. Each of reference characters 7b and 7c designates a pipe line with one end coupled to a tank (not shown) and the other end coupled to a coating section (not shown). In this bubble removing device, three different photographic emulsion liquids are delivered through the pipe lines 7a, 7b and 7c to the coating sections to achieve the coating operation. Each of the pipe lines 7a, 7b and 7c is a thin-wall pipe having a smooth inner surface.

The ultrasonic wave liquid tank 9 is provided with an inlet 15 for supplying hot water 12 which is the ultrasonic wave propagating liquid and an outlet 16 for discharging the hot water. A discharge outlet 17 is used for discharging or flushing hot water from tank 9.

A throttle valve 10 is used for continuously pressurizing the photographic emulsion liquid 2 flowing in the liquid conduit 7. The photographic emulsion liquid 2 is pressurized by the throttle valve 10 and the pump 8, so that the pressure in the pipe line 7a (or 7b or 7c) is set to a value within an absolute pressure range from 1.3 kg/cm$^2$ to 5.0 Kg/cm$^2$.

An ultrasonic wave oscillator 11 is provided on the bottom of the ultrasonic wave liquid tank 9. The frequency of an ultrasonic wave generated by the oscillator 11 is, in general, 20 KHz to 60 KHz, and the output thereof is 0.05 W/cm$^2$ to 0.8 W/cm$^2$. The oscillations are propagated through the hot water 12 in the ultrasonic wave liquid tank 9 and the wall of the liquid conduit 7 to the photographic emulsion liquid 2 being delivered under pressure.

A heat exchanger 13 is adapted to maintain the prepared photographic emulsion liquid 2 in the liquid conduit 7 substantially at a coating temperature. The heat exchanger is interposed between the valve 10 and the tank 9.

The operation of the bubble removing apparatus thus constructed will now be described.

The photographic emulsion liquid 2 in the tank 1 is agitated and prepared by the agitator 3. As a result, relatively large bubbles in the liquid will rise to the surface. During this period, hot water 2 flows through the hot water inlet 5 into the jacket 4 and flows out through the outlet 6. Therefore the temperature of the photographic emulsion liquid 2 is increased to a temperature equal to or slightly higher than the temperature of the coating section so that the emulsion liquid 2 reaches its saturated solution at that temperature. The photographic emulsion liquid 2 in the saturated solution state is delivered to the pipe line 7a in the ultrasonic wave liquid tank 9 by the pump 8 while the occurrence of a vapor-liquid interface is prevented. The temperature of the photographic emulsion liquid 2 is adjusted to a temperature close to the coating temperature. In this embodiment, with parallel action in lines 7a, 7b and 7c, the same action in pipe line 7a is also imparted to the pipe lines 7b and 7c.

If, as described above, the emulsion liquid is delivered under pressure through the liquid conduit 7 connected to the bottom of the tank 1 in such a manner that no vapor-liquid interface is provided, then relatively large bubbles contained in the photographic emulsion liquid 2 are caused to surface on the liquid in the tank 1. Therefore only very small bubbles are left in the liquid conduit 7. Accordingly, even if all of the same bubbles are dissolved in the liquid in the conduit 7, the increment of the quantity of air dissolved in the photographic emulsion 2, is small when compared with the case where a gas-liquid interface exists. It is substantially equal to the saturation solubility at the temperature and pressure in the tank 1.

In other words, when bubbles are dissolved in the liquid, only very small bubbles tend to remain in the liquid. The pressure of the very small bubbles can be represented by the sum of an external pressure imparted to the liquid and a force tending to minimize the bubble surfaces through surface tension, i.e. the increment component of an internal pressure. Therefore, even if the density of air with respect to liquid in an ordinary vapor-liquid interface shows supersaturation, it shows non-saturation in a bubble surface. Accordingly the bubbles in the liquid are not deposited. Thus, in the case where no vapor-liquid interface is available, the increment of the quantity of air dissolved in the liquid is a minimum. Therefore, deposition of the bubbles in the liquid is substantially avoided when compared with the case where a vapor-liquid interface is available.

For this reason, the temperature of the liquid in the tank 1 is not always required to be higher than the coating temperature. That is, even if it is equal to or slightly lower than the coating temperature as will be described with reference to several examples, no deposition of bubbles in the coating section 14 will occur.

Accordingly, in the case of an ordinary liquid from which bubbles are to be removed, the bubbles are dissolved in the liquid merely by delivering it in the pipe line 7a under pressure. Even if the liquid is exposed under the atmospheric pressure when used, bubbles are rarely deposited.

However, in the case of a liquid such as the photographic emulsion liquid 2 which contains several additives and is of high viscosity and low in surface tension coating failure results even if only one small bubble is contained therein in the coating process. Hence, the liquid delivery in the pipe line 7a without vapor-liquid interfaces under pressure is inadequate. Therefore, in the embodiment of the invention, ultrasonic vibration is imparted to the liquid, such as a photographic emulsion liquid 2 in the pipe line 7a to thereby dissolve the small bubbles in the liquid so that any remaining bubbles are eliminated.

As is apparent from the above description, the photographic emulsion liquid 2 containing bubbles in the tank 1 is delivered to the coating section 14 after the bubbles have been removed while the liquid 2 passes through the ultrasonic wave liquid tank 9. Therefore no bubbles are deposited when the coating operation is carried out in the coating section 14 under the atmospheric pressure.

Since the photographic emulsion liquid 2 flows in the pipe line 7a (or 7b or 7c) which is a thin-wall pipe having a smooth inner surface and is disposed substantially horizontal and straight in the ultrasonic wave liquid tank 9, the vibration of the ultrasonic wave is uniformly applied to the liquid. The bubbles can therefore be effectively removed from the liquid. For the same reason, there is no condensation of the additives due to the retention of the liquid and the evaporation from the vapor-liquid interface.

Also, the liquid conduit can be washed merely by supplying washing water. Therefore, the maintenance of the device is simple and inexpensive. Furthermore, the construction of the device is also simple without requiring intricate parts or valving and therefore, the device can be manufactured at low cost.

Figure 3:
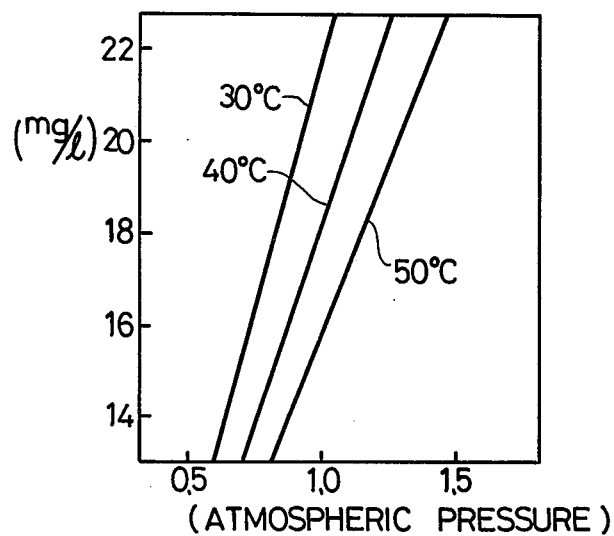
FIG. 3 is a graphical representation indicating solubility characteristics of a bubble removal liquid.

In the bubble removing device, the heat exchanger 13 is provided in the liquid path extending from the ultrasonic wave liquid tank 9 through the throttle valve 10 to the coating section 14, to decrease the temperature of the photographing emulsion liquid 2 to substantially the coating temperature. This is to increase the saturation solubility by decreasing the temperature of the liquid (see FIG. 3). That is, the heat exchanger is an auxiliary security device used in the case where deposition of bubbles cannot be completely eliminated even by the action of ultrasonic wave under pressure. Accordingly, in the case of many photographic emulsion liquids, the heat exchanger 13 is used in order to maintain the coating temperature rather than decrease the liquid temperature. Therefore, the heat exchanger 13 may be omitted if the photographic emulsion liquid 2 can be maintained at a suitable temperature by the hot water 12 in the ultrasonic wave liquid tank 9.

The temperature decreasing range in this case is of the order of 0.1° C. to 1.0° C., and is sufficient because of the increment of the quantity of air dissolved in the liquid under pressure. Also, with no vapor-liquid interface it is not significant.

The invention has been described with reference to the case where bubbles are removed from the silver halogenide photographic emulsion liquid; however, the invention is not limited to that particular working fluid. That is, various changes and modifications can be made therein without departing from the invention.

For instance, the number of tanks 1 (accordingly, the number of liquid conduits 7, and the number of pipe lines 7a) can be increased or decreased as desired. Since the pump 8 is used to deliver and pressurize the liquid from which bubbles should be removed, any pump can be used for this component if it satisfies these requirements. Furthermore, instead of the pump 8, the pressure of gravity due to head difference can alternatively be utilized to deliver the liquid.

The liquid is pressurized by the pump 8 and the throttle valve 10 as described before. Since the throttle valve 10 is to provide for pressure loss to the continuously delivered liquid, it is not always necessary to use such a valve; that is, the same effect may be obtained by utilizing the liquid conduit. In terms of the pressurizing conditions in removing bubbles with the ultrasonic wave, the absolute pressure should be at least 1.3 Kg/cm$^2$, and a value 5.0 Kg/cm$^2$ is sufficient as the upper limit.

Figure 4:
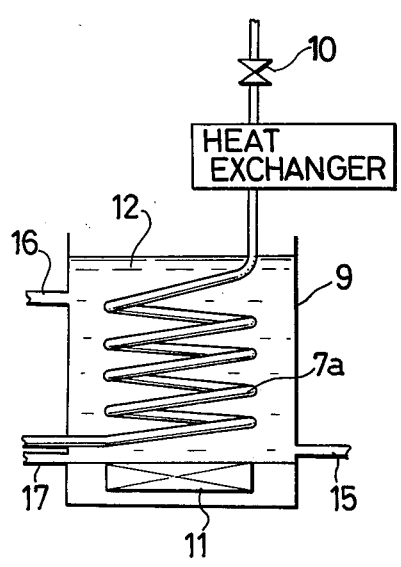
FIGS. 4 and 5 are sectional views showing other examples of the bubble removing device according to the invention.
Figure 5:
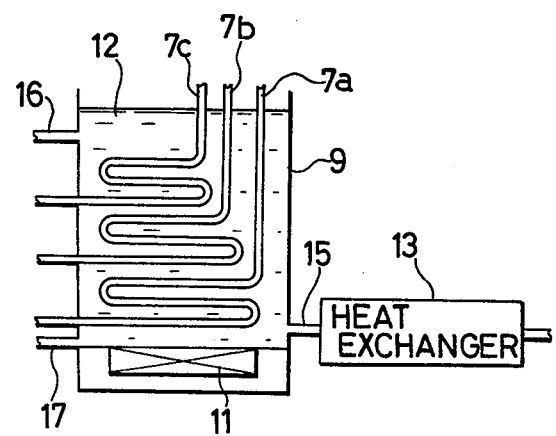

It is not always necessary that the pipe line in the ultrasonic wave liquid tank 9 be straight as in the above-described embodiment. That is, it may be replaced by a spiral pipe line 7a which rises gradually as shown in FIG. 4, or by a pipe line (7a, 7b or 7c) extended upwardly in zigzag state in the ultrasonic wave liquid tank 9 as shown in FIG. 5. Hence, the same effect can be achieved by these modifications of the conduit 7.

If such a curved pipe line is employed, the bubble removing device is liable to be somewhat intricate; however, this method provides some advantages. Since the path of the liquid 2 is increased in the ultrasonic wave liquid tank 9, the action of ultrasonic wave imparted to the liquid takes place for a longer period of time. Accordingly the dissolution or elimination of bubbles in a liquid whose quality is not changed with time can be improved. The capability for removing bubbles of the device is therefore higher than that of the device having the straight pipe line.

In the embodiment of the invention shown in FIG. 5, the heat exchanger 13 is provided on the side of the hot water supplying inlet 15 of the ultrasonic wave liquid tank 9 to thereby to control the temperature of the hot water 12. This is contrasted with the embodiments of FIGS. 1 and 4 where the heat exchanger is located on line 7 downstream of tank 9.

In providing the various pipe lines described above to the ultrasonic wave liquid tank 9, it is preferable that the pipe lines are arranged in such a manner that they rise gradually to prevent the production of vapor-liquid interfaces (which may be caused especially when the liquid delivery is started) by taking into consideration the frequency of vibration produced by the ultrasonic wave oscillator 11. This will obtain the best action of the ultrasonic wave.

The diameter of the pipe line may also be changed as desired depending on the viscosity and the required flow rate of the liquid from which bubbles should be removed.

The configuration of the pipe line is not limited. That is, any pipe line may be employed if it has a smooth inner surface and forms a substantially horizontal flow path thereby to provide a uniform flow of liquid without causing a vapor-liquid interface therein.

It is preferable to minimize the use of metal in ultrasonic wave vibration attenuation as the material of the pipe line, however, the pipe line may be made of a tube of synthetic high macromolecular material such as polyethylene or vinyl chloride.

The ultrasonic wave propagating liquid is not limited to the above-described hot water 12. That is, all liquids that can propagate the vibration can be employed as the ultrasonic wave propagating liquid. But, the use of a liquid which includes no bubbles is recommended.

The kinds of bubble removal liquids to which the invention is applicable are not particularly limited and the invention can be effectively applied to the removal of bubbles from a viscous liquid having gelatin as its base as in a photographic emulsion, a thioxiotropic liquid containing organic solvents as in coating liquids for magnetic materials, or a low viscosity liquid.

According to the invention, the following results can be obtained:

(1) Since the bubble removal liquid is pressurized via the liquid conduit disposed substantially horizontally and is delivered continuously without causing the vapor-liquid interface, almost all of the bubbles in the flowing liquid can be dissolved and eliminated. In addition, the above-described various conditions of ultrasonic wave vibration and liquid temperature are applied. Therefore, the dissolution and elimination action is further facilitated so that extremely small bubbles can be dissolved and eliminated. Furthermore, when the liquid from which the bubbles have been eliminated is exposed to the atmospheric pressure, no bubbles are deposited.

(2) Since the bubble removal liquid is allowed to flow in the pipe line having a smooth inner surface and thin walls, arranged straight in the ultrasonic wave liquid tank, the ultrasonic wave vibration is uniformly applied to the bubble removal liquid through the wall of the pipe. When the liquid delivering condition described above is added to this result, the bubble removal liquid is not retained and condensed at all in its flow path. Thus, the bubble removing efficiency is improved.

(3) Since the liquid conduit can be cleaned merely by allowing flushing water therethrough, the maintenance of the bubble removing device is simple. Furthermore, the operation and construction of the device are simple, therefore the device can be manufactured at low cost.

As conductive to a full understanding of the effects of this invention, several examples thereof will now be described:

EXAMPLE 1

A comparative test was made using the bubble removing device shown in FIG. 2 according to this invention and the conventional bubble removing device having a vapor-liquid interface as shown in FIG. 1 and disclosed by Japanese Patent Publication No. 5295/1976. The effects of removing bubbles from a gelatin aqueous solution were compared with each other under the following conditions:

(A) First, with the bubble removing device according to the invention, 6% gelatin aqueous solution, viscosity 50 c.p. and surface tension 30 dynes/cm, prepared and stored in the tank 1 was supplied to a stainless pipe line 7a, 1000 mm in length, 38 mm in inside diameter and 0.6 mm in wall thickness, disposed in the ultrasonic wave liquid tank 9 under the conditions that the internal operating pressure was 2.2 Kg/cm$^2$ in absolute pressure and the flow rate was 6 l/min. It was discharged into the coating section 14 to coat a photographing film support. In addition, the temperatures of the liquids in the tank 1 and the ultrasonic wave liquid tank 9 were maintained equal to the temperature 40° C. of the coating section 14. The ultrasonic wave oscillator 11 was operated to generate an ultrasonic wave vibration with an output of 0.25 W/cm$^2$ and a frequency of 29 KHz.

While the liquid was being delivered continuously under pressure as described above, the number of bubbles per minute included in the gelatin aqueous solution flowing in the liquid conduit 7 was measured at the inlet and the outlet of the ultrasonic wave liquid tank 9 by using a bubble detecting device well known in the art. The number of bubbles included per 1 m$^2$ of a gelatin film formed on the photographing film support was visually counted by using a specimen 600 m$^2$ thereof. The resulting data are as indicated in column (A) of Table 1 below:

(B) Then, the same gelatin aqueous solution as that in paragraph (A) above was subjected to bubble removal in a ultrasonic wave liquid tank 9 having a capacity of 6 l by using the conventional bubble removing device shown in FIG. 1, under the same conditions, and the gelatin aqueous solution from which the bubbles had been removed was applied onto a photographing film support similarly as in paragraph (A). The number of bubbles at each of the inlet and outlet of the tank 9 and the number of bubbles in the gelatin film on the photographing film support were measured similarly as in paragraph (A). The resultant data are as indicated in column (B) of Table 1 below.

Table 1

| Number of bubbles Methods | Inlet of the ultrasonic wave liquid tank (ea) | Outlet of the ultrasonic wave liquid tank (ea) | Gelatin film on the support |
| --- | --- | --- | --- |
| (A) | 360 | 0 | 0 |
| (B) | 295 | 0 | 32 |

As is apparent from Table 1, with the bubble removing device according to the invention, unlike the conventional one, no bubbles are included in the coated surface; that in, deposition of bubbles did not occur under the atmospheric pressure.

EXAMPLE 2

The ultrasonic wave liquid tank 9 having the spiral pipe line 7a shown in FIG. 4 was used. The degree of bubble removal effect with variations of the pressuring condition (or the absolute pressure in the liquid conduit 7 immediately after the pump 8) of the same gelatin aqueous solution as that in Example 1 was measured at the inlet and outlet of the ultrasonic wave liquid tank 9. The resultant data are as indicated in Table 2. The pipe line 7a was a vinyl hose, 2 mm in wall thickness, 26 mm in inside diameter and 19 m in length. The temperature of the hot water 12 in the ultrasonic wave liquid tank 9 and the temperature of the gelatin aqueous solution 2 were set to 40° C. The output and frequency of the oscillator 11 were 0.25 W/cm$^2$ and 29 KHz, respectively. The flow rate of the gelatin aqueous solution 2 was 5 l/min as shown in Table 2.

Table 2

| Condition Flow rate (l/min) | Absolute Value right after the pump 8 (Kg/cm$^2$) | Inlet of the ultrasonic wave liquid tank (ea) | Outlet of the ultrasonic wave liquid tank (ea) |
| --- | --- | --- | --- |
| 5.0 | 1.1 | 717 | 150 |
| 5.0 | 1.2 | 704 | 5 |
| 5.0 | 1.3 | 753 | 0 |
| 5.0 | 1.4 | 842 | 0 |
| 5.0 | 1.5 | 917 | 0 |

As is apparent from Table 2, when the pressure in the liquid conduit 7 is 1.3 Kg/cm$^2$ or higher in absolute pressure, the bubble removal effect is significant.

I claim:

1. A method of ultrasonic wave type bubble removing for removing bubbles from a first liquid by imparting ultrasonic wave vibration to said first liquid, comprising the steps of:

disposing a part of a liquid conduit in an ultrasonic wave liquid tank which is provided with an ultrasonic wave oscillator and is filled with an ultrasonic wave propagating liquid;

delivering said first liquid through said part of said conduit without a vapor-liquid interface in said conduit and while maintaining an absolute pressure of 1.3 Kg/cm$^2$ or higher inside side liquid conduit; and generating ultrasonic wave vibration by said ultrasonic wave oscillator and imparting said vibration to said first liquid in said liquid pipe to dissolve the bubbles in said first liquid and prevent deposition of bubbles under the atmospheric pressure.

2. A method as claimed in claim 1 comprising the additional steps of:

heating said first liquid to a first temperature higher than a second temperature thereof obtained when used; and decreasing the temperature of said first liquid during said delivering step so that a solubility sufficient for preventing deposition of bubbles under the atmospheric pressure can be obtained.

3. The method as claimed in claim 1 comprising the additional step of maintaining the temperature of said first liquid in said conduit by heat exchange with said ultrasonic wave propagating liquid in said liquid tank.

4. The method as claimed in claims 1, 2 or 3 comprising the additional step of coating said first liquid on a substrate.

5. The method as claimed in claim 1 comprising the additional steps of disposing a second liquid conduit in said liquid tank, delivering a second liquid through said second conduit in said tank without a vapor-liquid interface in said second conduit, and imparting ultrasonic vibrations to said second liquid to dissolve any bubbles therein.

6. The method as claimed in claim 5, wherein said first liquid is the same as said second liquid.

7. The method as claimed in claim 5, wherein said second liquid is different from said first liquid.

8. In an ultrasonic wave type bubble removing device for removing bubbles from a first liquid by imparting ultrasonic wave vibration to said first liquid, the improvement comprising;

(a) a tank for preparing and storing said first liquid;

(b) a liquid conduit having its one end coupled to said tank and its other end communicating with a liquid delivering section under the atmospheric pressure;

(c) pressurizing and liquid delivering means for continuously delivering said first liquid through said liquid conduit while maintaining an absolute pressure of 1.3 Kg/cm$^2$ or higher inside said liquid pipe; and (d) an ultrasonic wave liquid tank provided with an ultrasonic wave oscillator and containing an ultrasonic wave propagating liquid and through which a part of said liquid conduit passes.

9. A device as claimed in claim 8, wherein said device further comprises a heat exchanger disposed downstream of said tank for decreasing a temperture of said first liquid continuously delivered under pressure so as to obtain a solubility sufficient for preventing deposition of bubbles under the atmospheric pressure.

10. A device as claimed in claims 8 or 9, wherein said liquid conduit passes through said liquid tank in a substantially horizontal manner.

11. A device as claimed in claim 10 comprising a plurality of liquid conduits passing through said liquid tank in a substantially horizontal manner.

12. A device as claimed in claims 8 or 9, wherein said liquid conduit is disposed in said tank in a generally helical manner, said conduit being arranged to enter said tank near the bottom thereof and the helical portion disposed to ascend in said tank.

13. A device as claimed in claims 8 or 9, wherein said liquid conduit is shaped in a zig-zag manner during the portion passing through said liquid tank.

14. A device as claimed in claim 13 further comprising a plurality of zig-zag shaped conduits passing through said liquid tank.

* * * * *